(12) United States Patent
Maeda et al.

(10) Patent No.: US 11,645,868 B2
(45) Date of Patent: May 9, 2023

(54) MONITORING SYSTEM AND MONITORING METHOD

(71) Applicant: FUJITSU LIMITED, Kawasaki (JP)

(72) Inventors: Satoshi Maeda, Atsugi (JP); Yukihiro Abiko, Kawasaki (JP); Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/106,398

(22) Filed: Nov. 30, 2020

(65) Prior Publication Data
US 2021/0166000 A1 Jun. 3, 2021

(30) Foreign Application Priority Data
Dec. 3, 2019 (JP) .............................. JP2019-219049

(51) Int. Cl.
*G06V 40/16* (2022.01)
*G06V 10/60* (2022.01)
*G06V 10/141* (2022.01)
*G06V 20/52* (2022.01)

(52) U.S. Cl.
CPC .......... *G06V 40/165* (2022.01); *G06V 10/141* (2022.01); *G06V 10/60* (2022.01); *G06V 20/52* (2022.01); *G06V 40/172* (2022.01)

(58) Field of Classification Search
CPC .. G06V 40/165; G06V 40/172; G06V 40/166; G06V 10/141; G06V 10/60; G06V 10/145; G06V 20/52
See application file for complete search history.

(56) References Cited

U.S. PATENT DOCUMENTS

| 2009/0322906 | A1* | 12/2009 | Watanabe | .......... H04N 5/23219 |
| | | | | 348/E5.031 |
| 2015/0252980 | A1* | 9/2015 | Maeda | .................... G06V 40/13 |
| | | | | 362/235 |
| 2017/0249501 | A1* | 8/2017 | Sijde | ....................... G06V 20/10 |
| 2017/0325721 | A1 | 11/2017 | Matsuda et al. | |

(Continued)

FOREIGN PATENT DOCUMENTS

| CN | 108197546 A | * | 6/2018 | ......... G06K 9/00228 |
| CN | 110443160 A | * | 11/2019 | |
| EP | 2919157 | | 9/2015 | |

(Continued)

OTHER PUBLICATIONS

CCM-RE1 Color Camera Manual By Linear Solutions (https://linear-solutions.com/product/color-camera-3/) (Year: 2011).*

(Continued)

*Primary Examiner* — Edward F Urban
*Assistant Examiner* — Wassim Mahrouka
(74) *Attorney, Agent, or Firm* — Staas & Halsey LLP

(57) ABSTRACT

A monitoring system includes a memory, and a processor coupled to the memory and configured to detect a face area of a subject from a captured image divided into a plurality of blocks according to a number of light emitting elements that irradiate an image capturing range, and control a light emission intensity of a light emitting element corresponding to a block including the face area among the plurality of blocks according to one of a position of the face area and a size of the face area.

8 Claims, 15 Drawing Sheets

(56) References Cited

U.S. PATENT DOCUMENTS

2018/0063403 A1  3/2018  Ryu et al.
2021/0263136 A1* 8/2021  Joo ...................... G01S 7/4911

FOREIGN PATENT DOCUMENTS

| EP | 3401841    | 11/2018 |
| JP | 2012-134309 | 7/2012  |
| JP | 2015-170320 | 9/2015  |
| WO | 2016/084214 | 6/2016  |

OTHER PUBLICATIONS

SV3C (5MP WiFi PTZ Camera Outdoor, SV3C 5 Megapixel Security Cameras, Pan Tilt Zoom IP Camera with Human Motion Detection, 200FT Night Vision, Two-Way Audio, SD Card Record, Metal Housing Waterproof Camera) on amazon.com (https://a.co/d/2qlg4DZ) (Year: 2019).*
Extended European Search Report dated Mar. 17, 2021 from European Application No. 20210015.2.
European Office Action dated Feb. 13, 2023 for European Application No. 20210015.2.

* cited by examiner

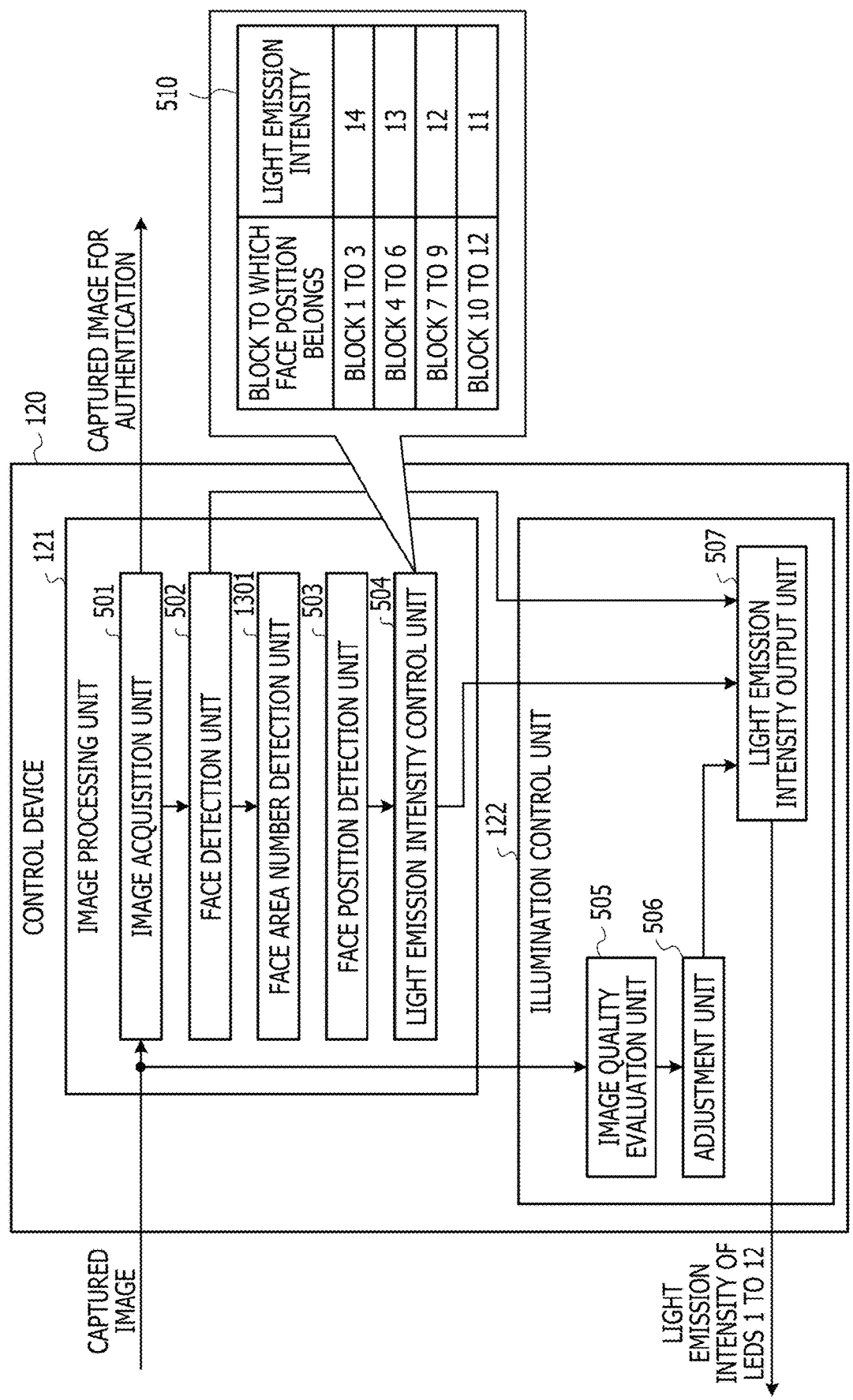

MONITORING SYSTEM AND MONITORING METHOD

CROSS-REFERENCE TO RELATED APPLICATION

This application is based upon and claims the benefit of the prior Japanese Patent Application No. 2019-219049, filed on Dec. 3, 2019, the entire contents of which are incorporated herein by reference.

FIELD

The embodiments discussed herein are related to a monitoring system and a monitoring method.

BACKGROUND

As an example of a biometric authentication technology based on biometric images, a face authentication technique using a monitoring camera installed outside a building or at a building entrance is known in the related art. In the face authentication technique, in order to suppress the influence of backlight or oblique light, for example, an illumination device that irradiates a living body is attached to the monitoring camera to improve the image quality of a biometric image to be captured.

Related techniques are disclosed in, for example, International Publication Pamphlet No. WO 2016/084214.

SUMMARY

According to an aspect of the embodiments, a monitoring system includes a memory, and a processor coupled to the memory and configured to detect a face area of a subject from a captured image divided into a plurality of blocks according to a number of light emitting elements that irradiate an image capturing range, and control a light emission intensity of a light emitting element corresponding to a block including the face area among the plurality of blocks according to one of a position of the face area and a size of the face area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a fourth view illustrating an example of the functional configuration of the control device;

DESCRIPTION OF EMBODIMENTS

Figure 1:
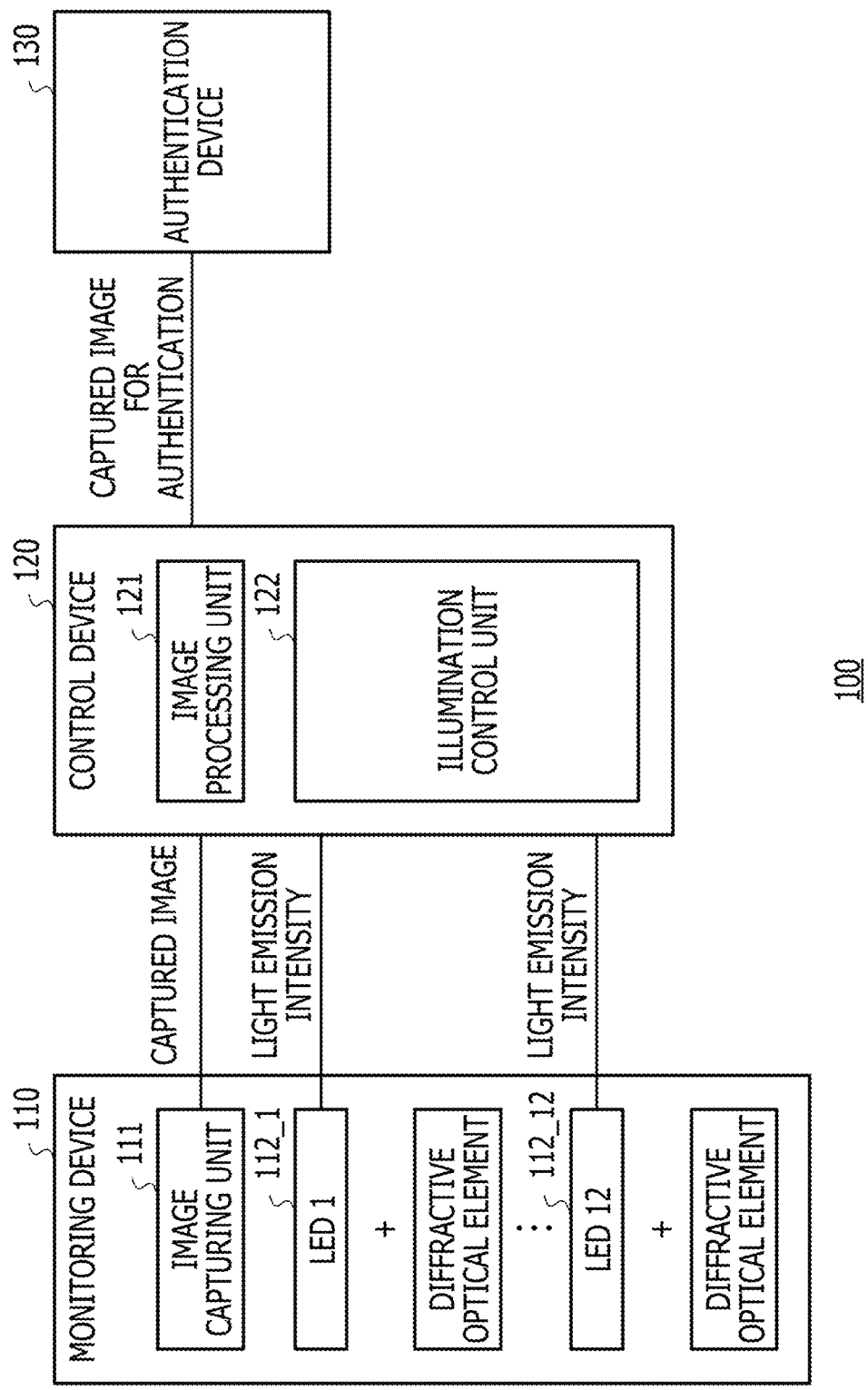
FIG. 1 is a view illustrating an example of the system configuration of a monitoring system.

Since the brightness of an illumination light decreases in inverse proportion to the square of a distance, the face of a distant subject appears dark while the face of a nearby subject appears bright. That is, the image capturing distance at which an image may be captured with appropriate brightness is limited.

Hereinafter, embodiments of a technique capable of capturing a subject's face with constant brightness will be described with reference to the accompanying drawings. Throughout the present disclosure and the drawings, elements having substantially the same functional configuration are denoted by the same reference numerals, and explanation thereof will not be repeated.

First Embodiment

System Configuration of Monitoring System

First, the system configuration of a monitoring system will be described. FIG. 1 is a view illustrating an example of the system configuration of a monitoring system. As illustrated in FIG. 1, a monitoring system 100 includes a monitoring device 110, a control device 120, and an authentication device 130.

The monitoring device 110 is a monitoring camera with so-called spot lighting. Specifically, the monitoring device 110 has an image capturing unit 111. The monitoring device 110 also includes a plurality of sets of LEDs (Light Emitting Diodes) which are an example of light emitting elements, and diffractive optical elements. The example of FIG. 1 represents a case where the monitoring device 110 includes 12 sets of LEDs and diffractive optical elements (see sets 112_1 to 112_12).

The image capturing unit 111 captures an image of a subject (not illustrated) and transmits the captured image to the control device 120. Each of the sets 112_1 to 112_12 of LEDs and diffractive optical elements operates independently based on an instruction from the control device 120, and irradiates an image capturing range of the image capturing unit 111 with spot lighting. The light emission intensity of each of the sets 112_1 to 112_12 of LEDs and diffractive optical elements is controlled based on an instruction from the control device 120.

A control program is installed in the control device 120, and by executing the control program, the control device 120 functions as an image processing unit 121 and an illumination control unit 122.

The image processing unit 121 detects a face area of the subject from the captured image that has been received from the image capturing unit 111. The image processing unit 121 also determines the light emission intensity of each of the sets 112_1 to 112_12 of LEDs and diffractive optical elements, based on the detection result, and notifies the illumination control unit 122 of the determined light emission intensity.

Further, with the transmission of the determined light emission intensity to the illumination control unit 122, the image processing unit 121 transmits the captured image that has been received from the image capturing unit 111 to the authentication device 130, as a captured image for authentication.

The illumination control unit 122 evaluates the image quality of the captured image that has been received from the image capturing unit 111 at a predetermined period, and calculates the light emission intensity of each of the sets 112_1 to 112_12 of LEDs and diffractive optical elements which is necessary for detecting the face area of the subject. Further, the illumination control unit 122 controls each of the sets 112_1 to 112_12 of LEDs and diffractive optical elements to emit light with the calculated light emission intensity.

In addition, in order to obtain the captured image for authentication, when the light emission intensity is notified from the image processing unit 121, the illumination control unit 122 controls the corresponding set of LED and diffractive optical element (any one of the sets 112_1 to 112_12) to emit light with the notified light emission intensity.

The authentication device 130 calculates biometric information of the face area of the subject based on the captured image for authentication that has been transmitted from the control device 120, and compares the calculated biometric information with the biometric information of the face area registered in advance, so as to perform the face authentication.

Configuration of Monitoring Device

Figure 2A:
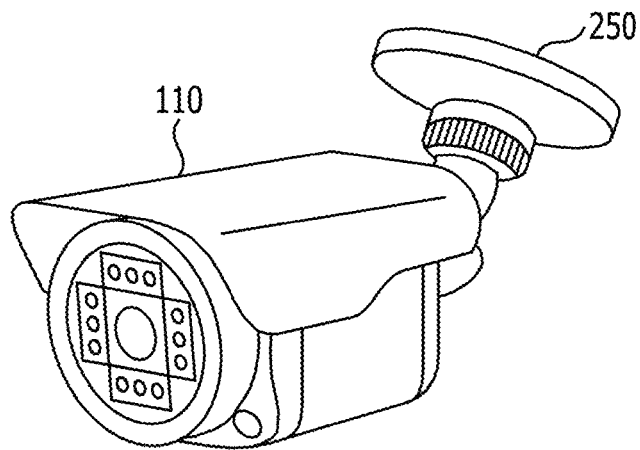
FIGS. 2A to 2C are views for explaining the configuration of a monitoring device.
Figure 2B:
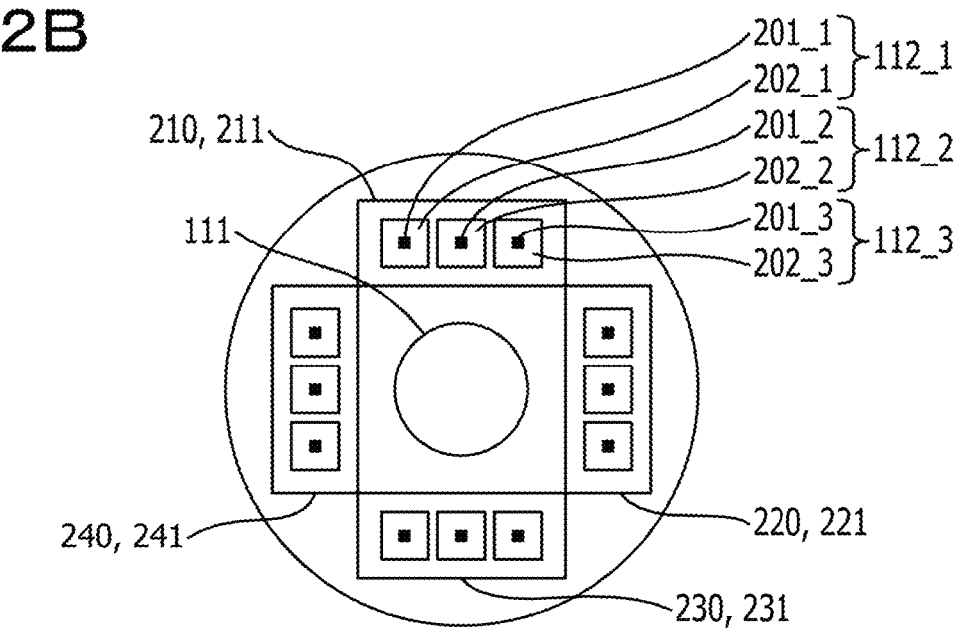
Figure 2C:
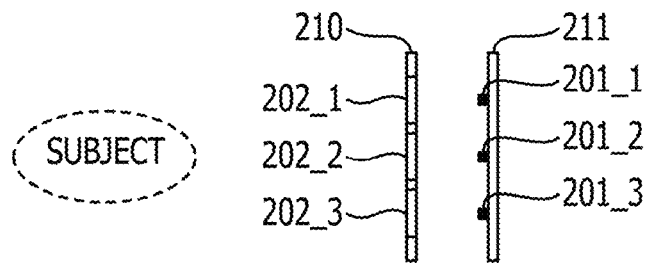

Next, the configuration of the monitoring device 110 will be described. FIGS. 2A to 2C are views illustrating the configuration of the monitoring device. FIG. 2A illustrates an external appearance configuration of the monitoring device 110. As illustrated in FIG. 2A, the monitoring device 110 includes a mounting jig 250 and is mounted outside a building or at a high place of building entrance.

FIG. 2B illustrates a device layout around the image capturing unit 111 when the monitoring device 110 is viewed from the front. As illustrated in FIG. 2B, in the case of the monitoring device 110, the set 112_1 of LED 201_1 and diffractive optical element 202_1, the set 112_2 of LED 201_2 and diffractive optical element 202_2, and the set 112_3 of LED 201_3 and diffractive optical element 202_3 are arranged horizontally from the left on the upper side of the image capturing unit 111 when viewed from the front.

Although reference numerals are omitted in FIG. 2B due to space limitations, in the case of the monitoring device 110, the set 112_4 of LED 201_4 and diffractive optical element 202_4, the set 112_5 of LED 201_5 and diffractive optical element 202_5, and the set 112_6 of LED 201_6 and diffractive optical element 202_6 are arranged vertically from above on the right side of the image capturing unit 111 when viewed from the front.

Similarly, in the case of the monitoring device 110, the set 112_7 of LED 201_7 and diffractive optical element 202_7, the set 112_8 of LED 201_8 and diffractive optical element 202_8, and the set 112_9 of LED 201_9 and diffractive optical element 202_9 are arranged horizontally from the right on the lower side of the image capturing unit 111 when viewed from the front.

Similarly, in the case of the monitoring device 110, the set 112_10 of LED 201_10 and diffractive optical element 202_10, the set 112_11 of LED 201_11 and diffractive optical element 202_11, and the set 112_12 of LED 201_12 and diffractive optical element 202_12 are arranged vertically from below on the left side of the image capturing unit 111 when viewed from the front.

FIG. 2C illustrates the arrangement of each set from the set 112_1 of LED 201_1 and diffractive optical element 202_1 to the set 112_3 of LED 201_3 and diffractive optical element 202_3 when viewed from above the monitoring device 110. As illustrated in FIG. 2C, the diffractive optical elements 202_1 to 202_3 are arranged on a diffractive optical element arrangement substrate 210. The LEDs 201_1 to 201_3 are arranged on a LED mounting substrate 211 at positions corresponding to the positions where the diffractive optical elements 202_1 to 202_3 are arranged.

As a result, light emitted by the LED 201_1 is converted into rectangular spot light via the diffractive optical element 202_1, and is irradiated on the image capturing range of the image capturing unit 111 as rectangular spot lighting. Similarly, light emitted by the LED 201_2 is converted into rectangular spot light via the diffractive optical element 202_2, and is irradiated on the image capturing range of the image capturing unit 111 as rectangular spot lighting. Similarly, light emitted by the LED 201_3 is converted into rectangular spot light via the diffractive optical element 202_3, and is irradiated on the image capturing range of the image capturing unit 111 as rectangular spot lighting.

It is assumed that the sets 112_4 to 112_12 are arranged in the same manner as in FIG. 2C and their respective LEDs, and diffractive optical elements are arranged in diffractive optical element arrangement substrates 220, 230, and 240 and LED mounting substrates 221, 231, and 241, respectively.

Example of Configuration of Diffractive Optical Element

Figure 3A:
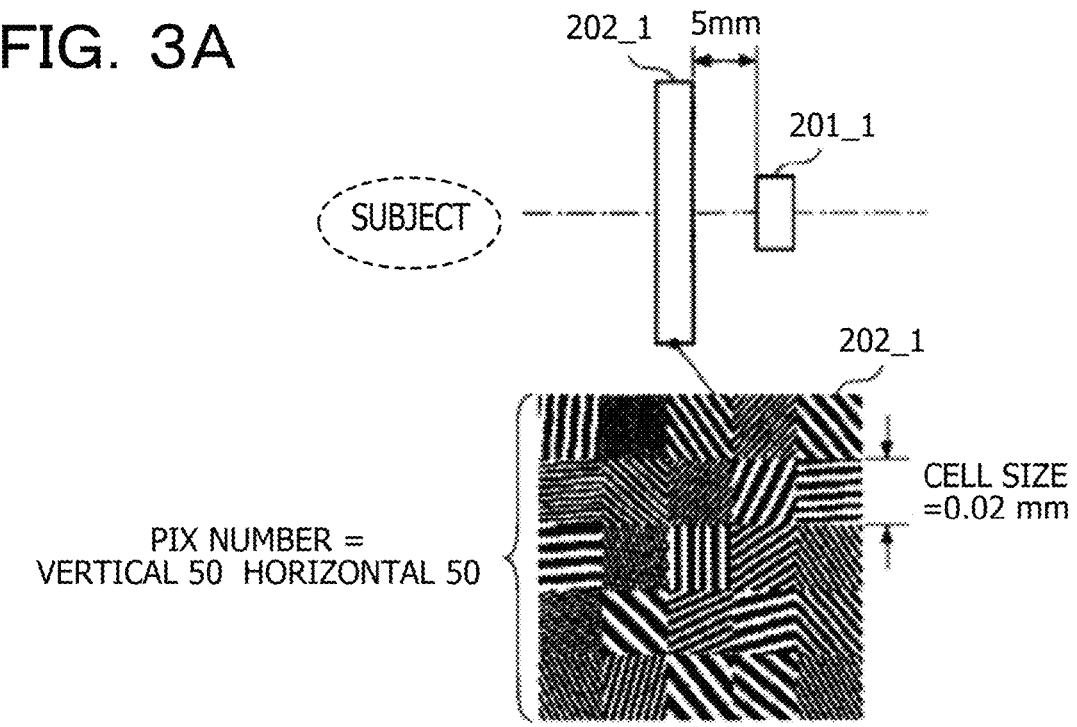
FIGS. 3A and 3B are views illustrating a configuration example of a diffractive optical element.
Figure 3B:
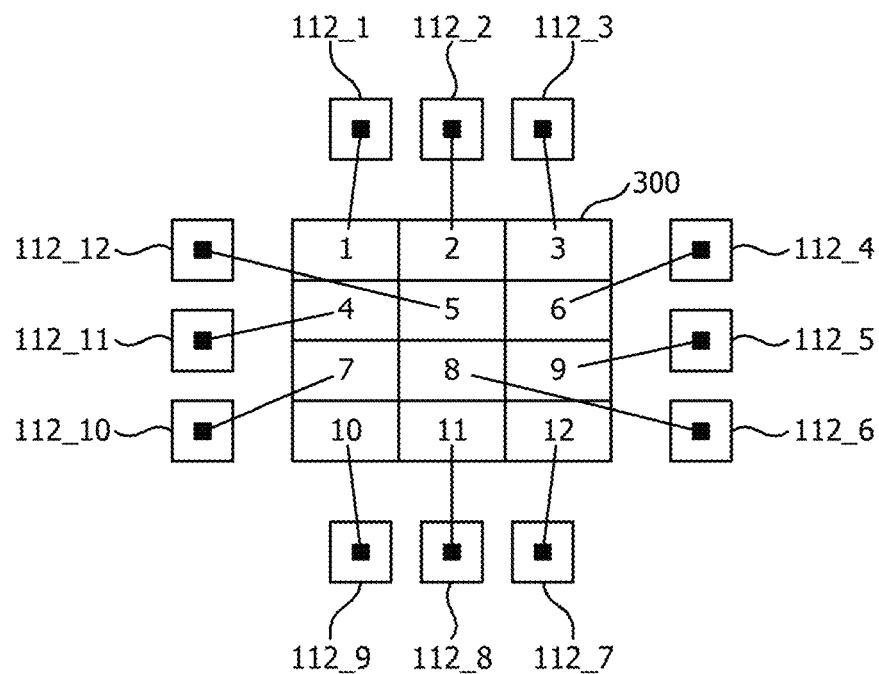

Next, the configuration of a diffractive optical element (here, the diffractive optical element 202_1) will be described. FIGS. 3A and 3B are views illustrating an example of a configuration of a diffractive optical element. As illustrated in FIG. 3A, the diffractive optical element 202_1 is formed by arranging linear diffraction gratings (cells) two-dimensionally in the same plane. The example in FIG. 3A represents a case where 50 diffraction gratings (cells) of 0.02 mm×0.02 mm are arranged in the vertical direction and 50 diffraction gratings of 0.02 mm×0.02 mm are arranged in the horizontal direction (250 in total).

Each of the diffraction gratings generates a plurality of dot lights when the light emitted from the LED 201_1 is transmitted. In addition, since the respective diffraction gratings have different pitches and rotation angles, the generated dot lights are combined in the image capturing range of the image capturing unit 111. Accordingly, the set 112_1 of LED 201_1 and diffractive optical element 202_1 may irradiate the image capturing range of the image capturing unit 111 with uniform rectangular spot lighting.

FIG. 3B is a view illustrating the correspondence relationship between the image capturing range of the image capturing unit 111 which is irradiated by each of the sets of LEDs and diffractive optical elements with rectangular spot lighting, and the captured image of the image capturing unit 111. As illustrated in FIG. 3B, a captured image 300 of the image capturing unit 111 is divided into a plurality of blocks according to the number of sets of LEDs and diffractive optical elements, and the corresponding set of LED and diffractive optical element irradiates the image capturing range corresponding to each block with rectangular spot lighting.

As described above, since 12 sets of LEDs and diffractive optical elements are arranged around the image capturing unit 111, the captured image 300 of the image capturing unit 111 is divided into 12 blocks. In FIG. 3B, each block is numbered, and the corresponding set of LED and diffractive optical element is indicated by a lead line.

For example, the set 112_1 of LED and diffractive optical element irradiates the image capturing range corresponding to the block of block number="1" with rectangular spot lighting.

Hardware Configuration of Control Device

Figure 4:
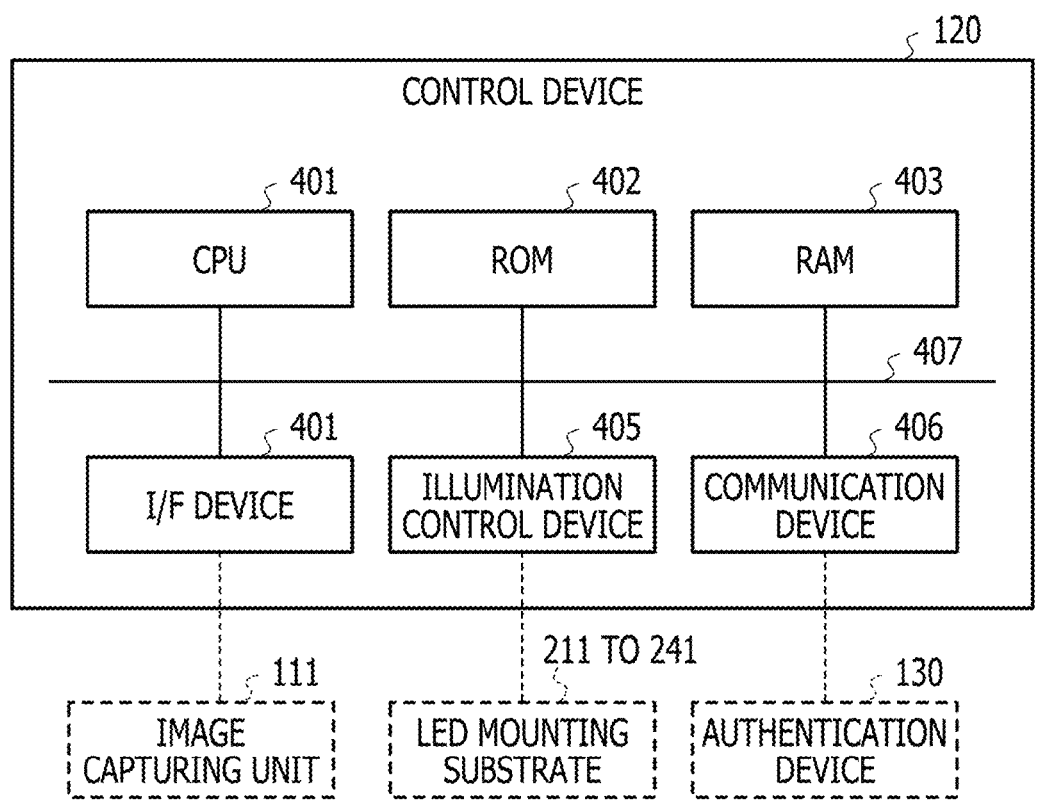
FIG. 4 is a view illustrating an example of the hardware configuration of a control device.

Next, the hardware configuration of the control device 120 will be described. FIG. 4 is a view illustrating an example of the hardware configuration of the control device.

As illustrated in FIG. 4, the control device 120 includes a CPU (Central Processing Unit) 401, a ROM (Read Only Memory) 402, and a RAM (Random Access Memory) 403. The CPU 401, the ROM 402, and the RAM 403 make up a so-called computer. Further, the control device 120 includes an I/F (Interface) device 404, an illumination control device 405, and a communication device 406. The respective units of the control device 120 are interconnected via a bus 407.

The CPU 401 is an arithmetic device that executes various programs (e.g., a control program and the like) installed in the ROM 402. The ROM 402 is a nonvolatile memory, and functions as a main memory device that stores the various programs executed by the CPU 401 and information used when the CPU 401 executes the various programs.

The RAM 403 is a volatile memory such as a DRAM (Dynamic Random Access Memory), a SRAM (Static Random Access Memory) or the like. The RAM 403 functions as a main memory device that provides a work area that is deployed when the various programs installed in the ROM 402 are executed by the CPU 401.

The I/F device 404 is a connection device for connecting to the image capturing unit 111 of the monitoring device 110. The illumination control device 405 is a control device for controlling the LED mounting substrates 211, 221, 231, and 241 of the monitoring device 110. The communication device 406 communicates with the authentication device 130.

Functional Configuration of Control Device

Figure 5:
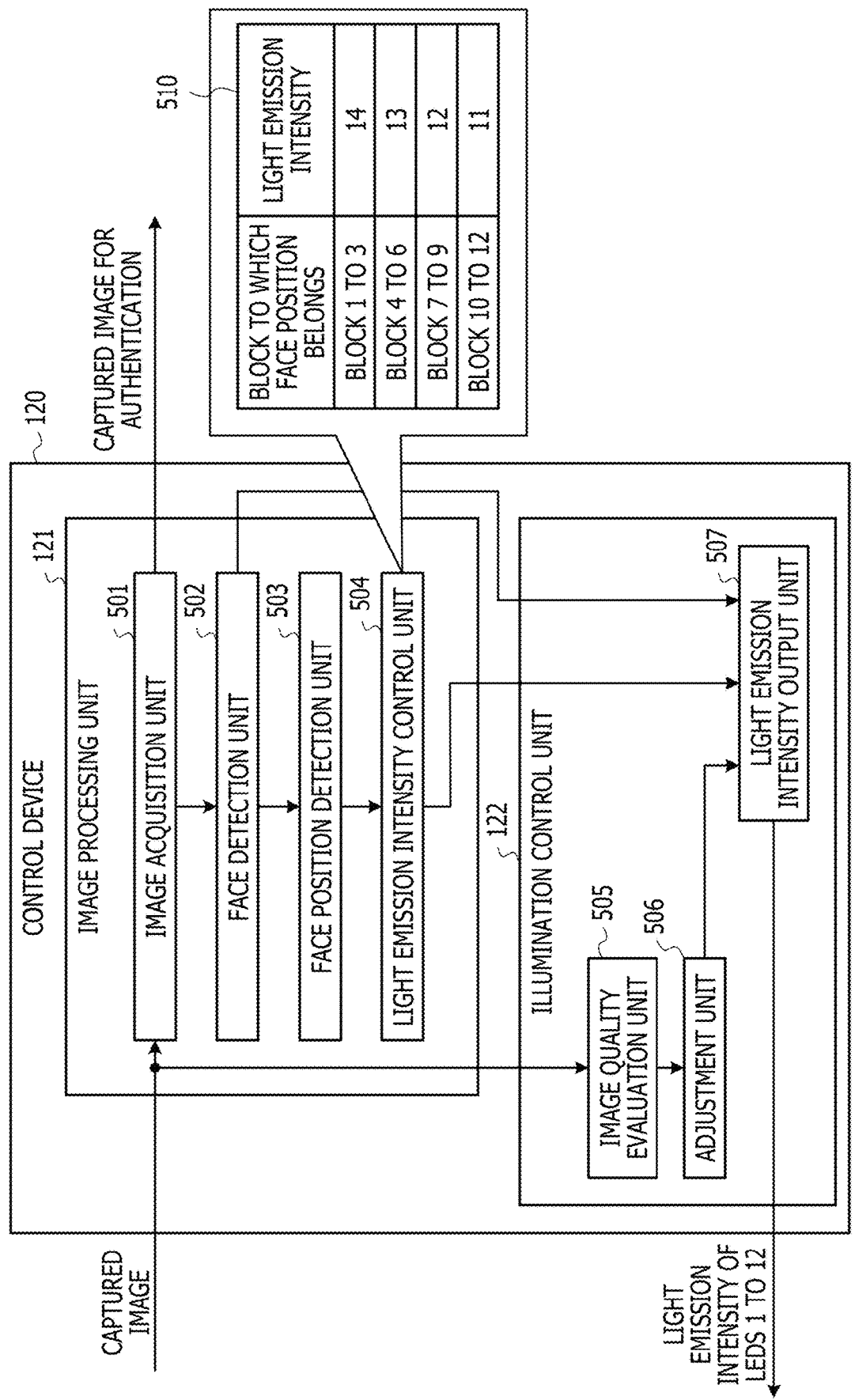
FIG. 5 is a first view illustrating an example of the functional configuration of the control device.

Next, the functional configuration of the control device 120 will be described. FIG. 5 is a first view illustrating an example of the functional configuration of the control device. As illustrated in FIG. 5, the image processing unit 121 includes an image acquisition unit 501, a face detection unit 502, a face position detection unit 503, and a light emission intensity control unit 504.

The image acquisition unit 501 acquires the captured image that has been transmitted from the image capturing unit 111 of the monitoring device 110, and notifies the captured image to the face detection unit 502. The image acquisition unit 501 also transmits the captured image that has been transmitted from the image capturing unit 111 of the monitoring device 110, to the authentication device 130 as a captured image for authentication.

The face detection unit 502 is an example of a detection unit, and processes the captured image that has been notified from the image acquisition unit 501 to detect the face area of the subject. The face detection unit 502 also notifies the face position detection unit 503 of the detected face area. Further, the face detection unit 502 determines a block including the detected face area, and notifies the block to the light emission intensity output unit 507.

The face position detection unit 503 is an example of a determination unit, and detects a position of the face area of the subject notified from the face detection unit 502, that is, a predetermined position within the face area, for example, the center position of the face area, the position of a specific part (eye, nose, etc.), or the like, and determines a block to which the detected position of the face area belongs. Further, the face position detection unit 503 notifies the light emission intensity control unit 504 of the block to which the position of the face area belongs.

The light emission intensity control unit 504 is an example of a control unit, and based on the block notified from the face position detection unit 503, determines the light emission intensity of a set of LED and diffractive optical element that irradiates the image capturing range corresponding to the block with spot lighting.

As illustrated in a table 510 of FIG. 5, it is assumed that the correspondence relationship between a block to which the position of the face area of the subject belongs and the light emission intensity is defined in advance. This is because the image capturing distance to the subject may be roughly estimated based on a block of the captured image to which the face area of the subject belongs, and the light emission intensity may be defined according to the estimated image capturing distance.

The example of the table 510 in FIG. 5 represents that the blocks of the captured image are divided into four groups, and different light emission intensities are associated with the groups, respectively.

Further, as illustrated in FIG. 5, the illumination control unit 122 includes an image quality evaluation unit 505, an adjustment unit 506, and a light emission intensity output unit 507.

The image quality evaluation unit 505 acquires the captured image that has been transmitted from the image capturing unit 111 of the monitoring device 110, and evaluates the quality of the acquired captured image. Specifically, the image quality evaluation unit 505 divides the acquired captured image into a plurality of blocks, and evaluates whether or not each block has a level of image quality where a face area may be detected. The image quality evaluation unit 505 also notifies the adjustment unit 506 of the evaluation result for each block.

The adjustment unit 506 adjusts the light emission intensity of the set of LED and diffractive optical element that irradiate the image capturing range corresponding to each block with spot lighting according to the evaluation result for each block notified from the image quality evaluation unit 505. Further, the adjustment unit 506 notifies the light emission intensity output unit 507 of the adjusted light emission intensity. As a result, the image capturing unit 111 may obtain a captured image that has a level of image quality where a face area may be detected.

The image quality evaluation unit 505 and the adjustment unit 506 operate at a predetermined period, for example, each time the surrounding environment changes, and therefore, the image capturing unit 111 may obtain a captured image that has a level of image quality where a face area may be detected even when the surrounding environment changes.

When the light emission intensity corresponding to each block is notified from the adjustment unit 506, the light emission intensity output unit 507 transmits the notified light emission intensity to the LED mounting substrates 211, 221, 231, and 241. As a result, each set of LED and diffractive optical element that irradiates the image capturing range that corresponds to each block with spot lighting may emit light with the notified light emission intensity.

In addition, when the light emission intensity is notified from the light emission intensity control unit 504, the light emission intensity output unit 507 transmits the notified light emission intensity to any of the LED mounting substrates 211, 221, 231, and 241. As a result, the set of LED and diffractive optical element that irradiates the image capturing range that corresponds to the block notified from the face detection unit 502 with spot lighting may emit light with the notified light emission intensity.

As a result, the image capturing unit 111 may obtain a captured image with the face area irradiated with spot lighting with the light emission intensity according to the image capturing distance to the subject.

Example of Operation of Monitoring System

Figure 6:
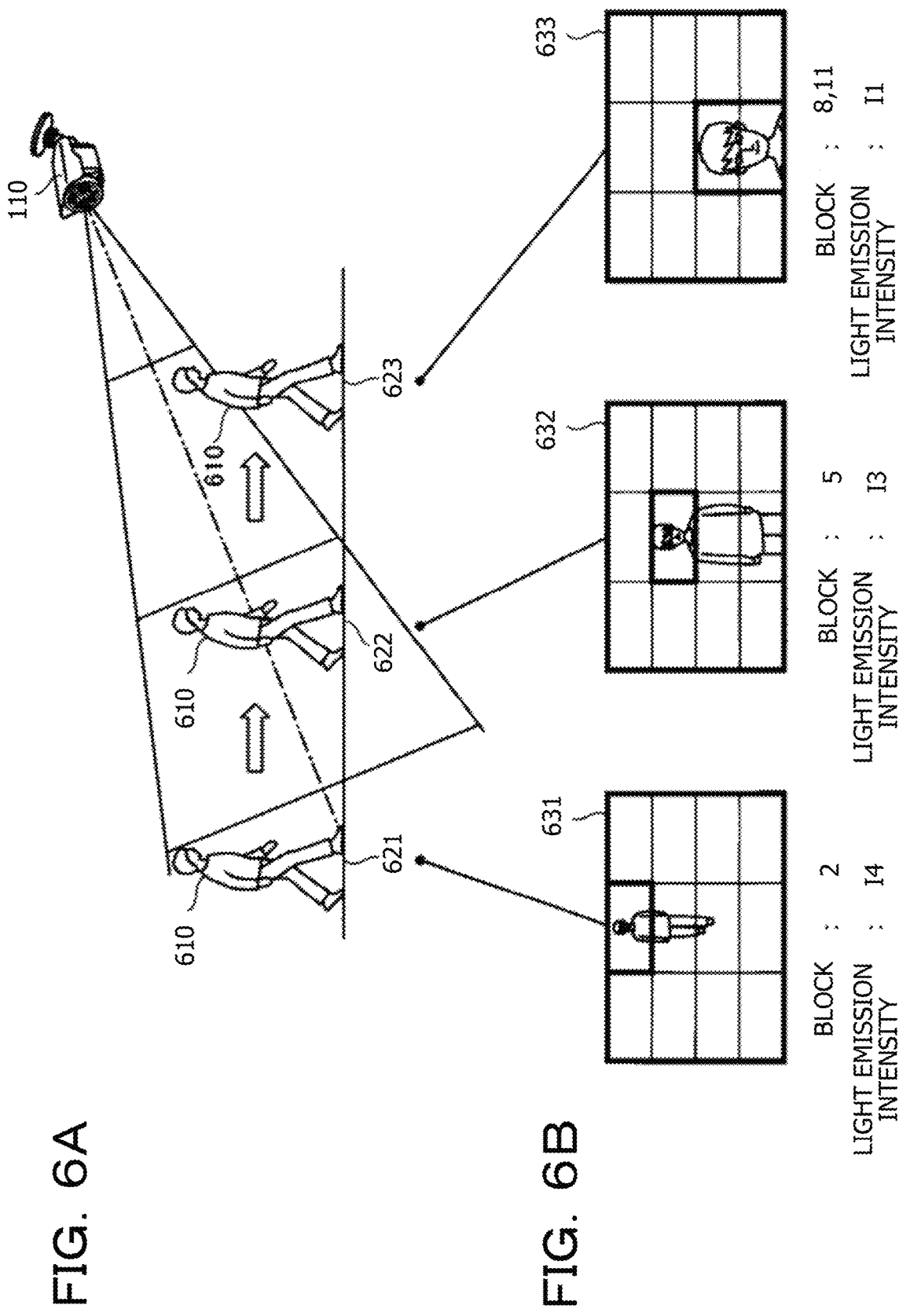
FIGS. 6A and 6B are first views illustrating an operation example of the monitoring system.

Next, an example of the operation of the monitoring system 100 will be described. FIGS. 6A and 6B are first views illustrating an example of the operation of the monitoring system. FIG. 6A illustrates a state where a subject 610 is approaching the monitoring device 110.

FIG. 6B illustrates captured images 631, 632, and 633 that are obtained by the monitoring device 110 at respective positions (positions 621, 622, and 623) of the subject 610 illustrated in FIG. 6A. It is assumed that when the captured images 631, 632, and 633 are obtained, the adjustment of the light emission intensity by the adjustment unit 506 has been completed, and the captured images 631, 632, and 633 have a level of image quality where the face area of the subject 610 may be detected.

In the case of the captured image 631, the face detection unit 502 determines that the block number of the block including the face area of the subject 610 is "2." Further, the face position detection unit 503 determines that the block number of the block to which the detected position of the face area of the subject 610 belongs is "2."

Accordingly, the light emission intensity control unit 504 determines the light emission intensity to be "I4." Then, the light emission intensity output unit 507 controls the set 112_2 of LED 201_2 and diffractive optical element 202_2 to emit light with the light emission intensity "I4."

Similarly, in the case of the captured image 632, the face detection unit 502 determines that the block number of the block including the face area of the subject 610 is "5." Further, the face position detection unit 503 determines that the block number of the block to which the detected position of the face area of the subject 610 belongs is "5."

Accordingly, the light emission intensity control unit 504 determines the light emission intensity to be "I3." Then, the light emission intensity output unit 507 controls the set 112_12 of LED 201_12 and diffractive optical element 202_12 to emit light with the light emission intensity "I3."

Similarly, in the case of the captured image 633, the face detection unit 502 determines that the block number of the block including the face area of the subject 610 is "8, 11." Further, the face position detection unit 503 determines that the block number of the block to which the detected position of the face area of the subject 610 belongs is "11."

Accordingly, the light emission intensity control unit 504 determines the light emission intensity to be "I1". Then, the light emission intensity output unit 507 controls the set 112_6 of LED 201_6 and diffractive optical element 202_6 and the set 112_8 of LED 201_8 and diffractive optical element 202_8 to emit light with the light emission intensity "I1."

Flow of Control Process

Figure 7:
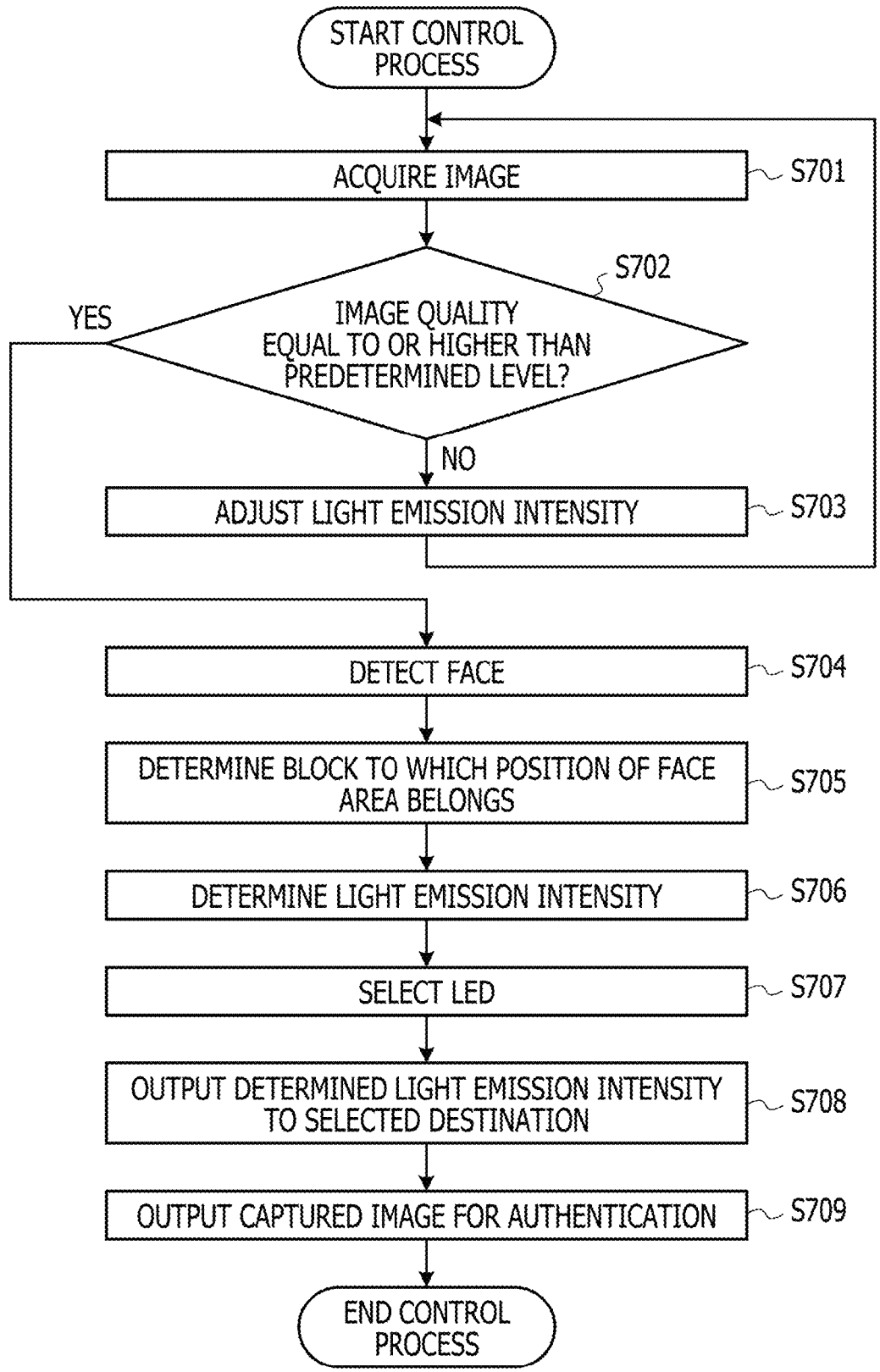
FIG. 7 is a first flow chart illustrating a flow of control process by the control device.

Next, a flow of the control process by the control device 120 will be described. FIG. 7 is a first flowchart illustrating a flow of the control process by the control device. In operation S701, the image acquisition unit 501 acquires a captured image from the image capturing unit 111 of the monitoring device 110.

In operation S702, the image quality evaluation unit 505 determines whether or not each block of the acquired captured image has a level of image quality where the face area of the subject may be detected (whether the image quality is equal to or higher than a predetermined level).

When it is determined in operation S702 that the image quality of any block of the captured image is lower than the predetermined level (No in operation S702), the process proceeds to operation S703.

In operation S703, the adjustment unit 506 adjusts the light emission intensity of a set of LED and diffractive optical element that corresponds to the block whose image quality is determined to be lower than the predetermined level, and the process returns to operation S701.

Meanwhile, when it is determined in operation S702 that the image quality of each block of the acquired captured image is equal to or higher than the predetermined level (Yes in operation S702), the process proceeds to operation S704. It is assumed that the processes of operation operations S702 and S703 are executed every predetermined period.

In operation S704, the face detection unit 502 processes the acquired captured image to detect the face area of the subject.

In operation S705, the face position detection unit 503 determines a block to which the position of the detected face area of the subject belongs.

In operation S706, the light emission intensity control unit 504 determines the light emission intensity based on the block to which the position of the face area of the subject belongs.

In operation S707, the face detection unit 502 determines a block including the detected face area. Thereby, the light emission intensity control unit 504 selects a set of LED and diffractive optical element to be controlled to emit light with the determined light emission intensity.

In operation S708, the light emission intensity output unit 507 transmits the determined light emission intensity to the LED mounting substrate so that the selected set of LED and diffractive optical element emits light with the determined light emission intensity.

In operation S709, the image acquisition unit 501 acquires a captured image from the image capturing unit 111 of the monitoring device 110 and transmits the acquired captured image to the authentication device 130 as a captured image for authentication.

As is apparent from the above description, the monitoring system according to the first embodiment detects the face area of the subject from the captured image of the image capturing unit, which is divided into a plurality of blocks according to the number of LEDs that irradiate the image capturing range of the image capturing unit. Further, the monitoring system according to the first embodiment controls an LED corresponding to a block including the face area of the subject among the plurality of blocks to emit light with the light emission intensity predetermined according to a block to which the position of the face area of the subject belongs.

In this way, with the monitoring system according to the first embodiment, by controlling the light emission intensity using the relationship between the block to which the position of the face area of the subject belongs and the image capturing distance to the subject, it is possible to capture the subject's face with constant brightness, regardless of the image capturing distance to the subject.

In addition, the monitoring system according to the first embodiment adjusts the light emission intensity every predetermined period so as to obtain a captured image with an image quality enough to detect the face area.

As a result, with the monitoring system according to the first embodiment, it is possible to detect the face area to capture the face of the subject with constant brightness even when the surrounding environment changes.

Second Embodiment

The case where the light emission intensity is determined based on the block to which the position of the face area of the subject belongs has been described in the first embodiment. However, the method for determining the light emission intensity is not limited thereto, but the light emission intensity may be determined according to the size of the face area of the subject. Hereinafter, a second embodiment will be described focusing on the differences from the first embodiment.

Functional Configuration of Control Device

Figure 8:
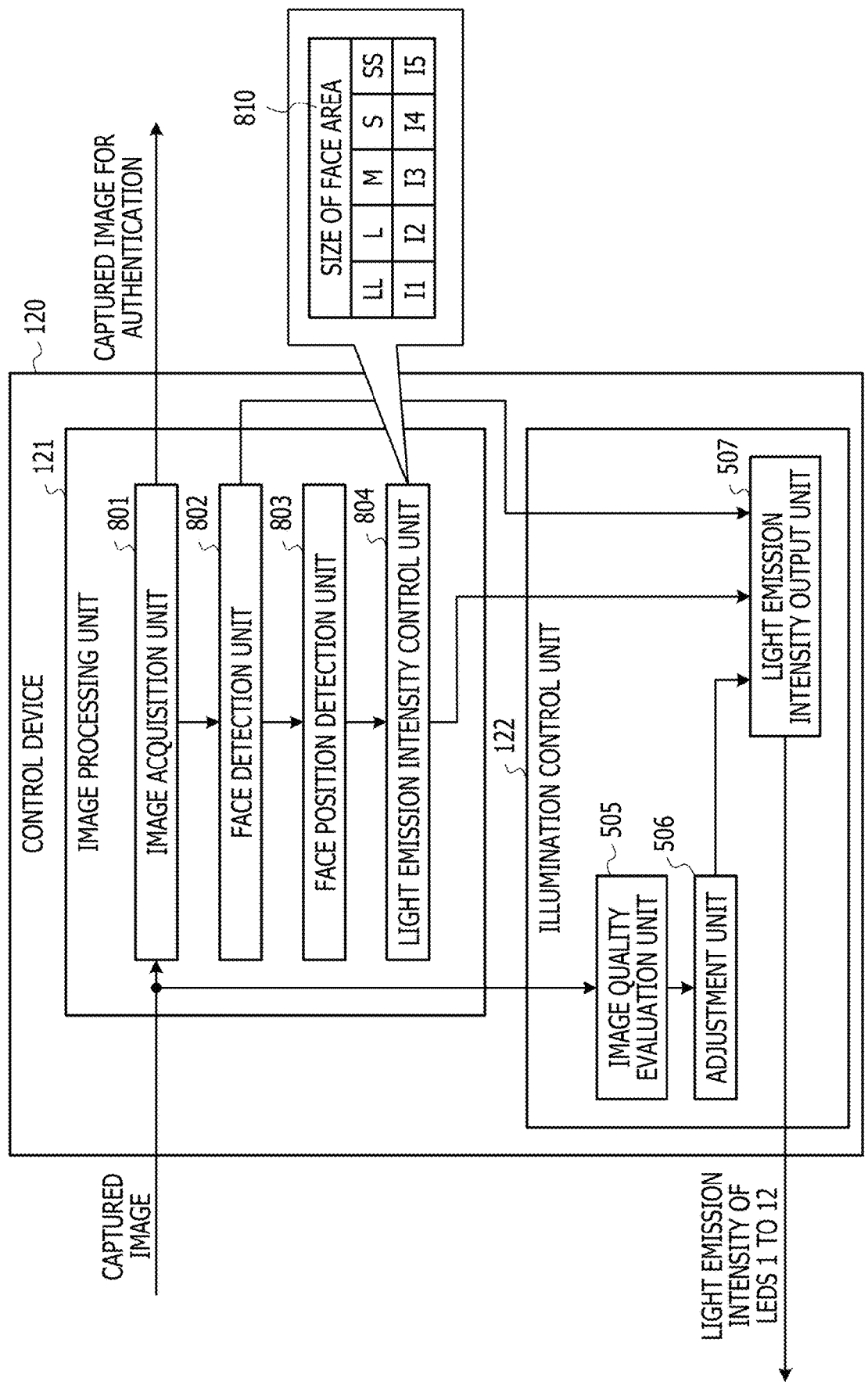
FIG. 8 is a second view illustrating an example of the functional configuration of the control device.

First, the functional configuration of the control device 120 according to the second embodiment will be described. FIG. 8 is a second view illustrating an example of the functional configuration of the control device. A difference from FIG. 5 lies in a face size calculation unit 801 and a light emission intensity control unit 802.

The face size calculation unit 801 is an example of a calculation unit, and calculates the size of the face area of the subject notified from the face detection unit 502. Further, the face size calculation unit 801 notifies the light emission intensity control unit 802 of the calculated size of the face area.

The light emission intensity control unit 802 is an example of a control unit, and determines the light emission intensity based on the size of the face area notified from the face size calculation unit 801. In addition, as illustrated in the table 810 of FIG. 8, it is assumed that the correspondence relationship between the size of the face area of the subject and the light emission intensity is defined in advance. This is because the image capturing distance to the subject may be roughly estimated according to the size of the face area of the subject, and the light emission intensity may be defined according to the estimated image capturing distance.

The example of the table 810 in FIG. 8 represents that the size of the face area is divided into five groups, and different light emission intensities are associated with the groups, respectively. However, instead of the table 810, the correspondence relationship between the size of the face area and the light emission intensity may be defined by a predetermined function.

Example of Operation of Monitoring System

Figure 9:
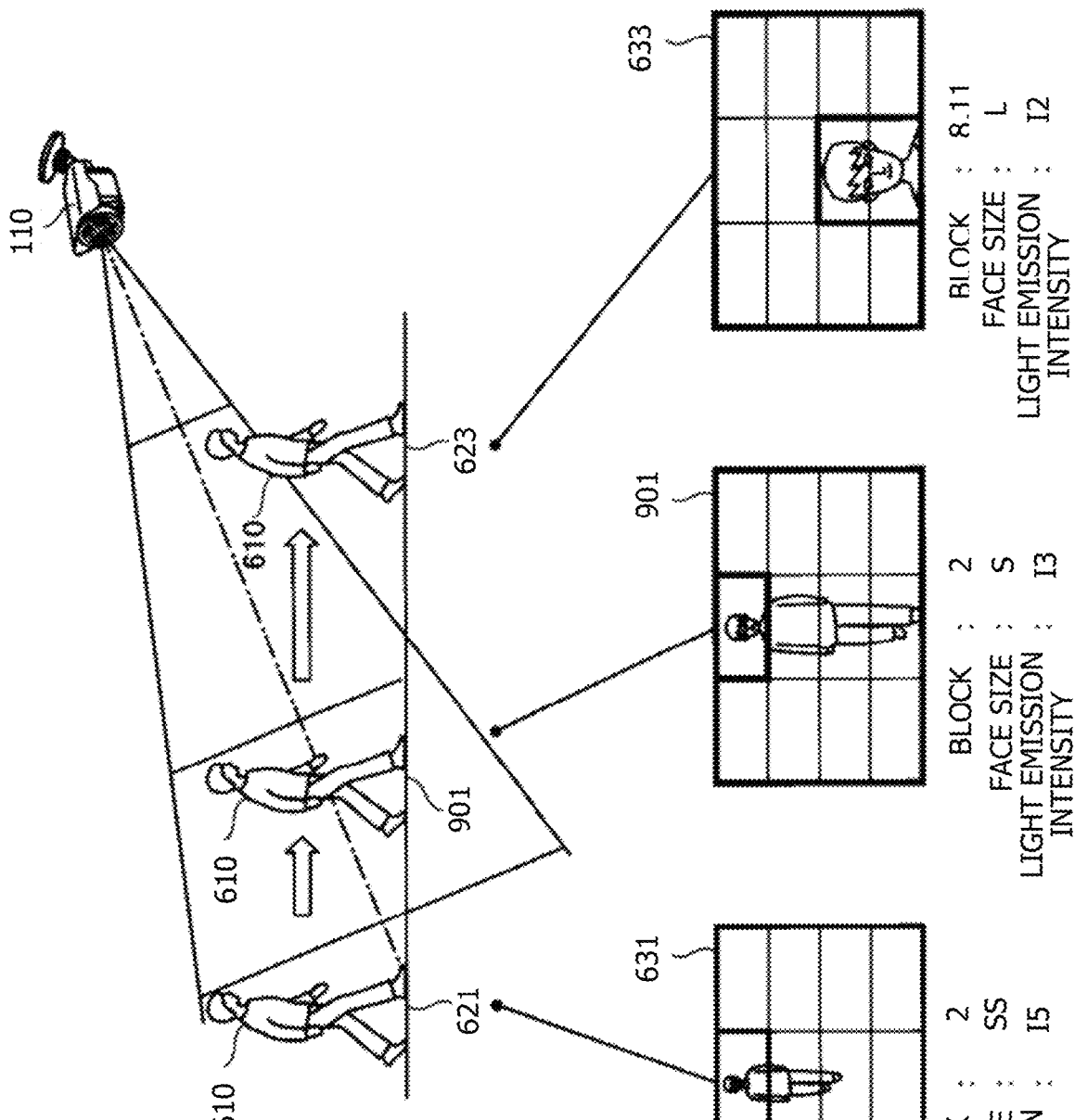
FIGS. 9A and 9B are second views illustrating an operation example of the monitoring system.

Next, an example of the operation of the monitoring system 100 will be described. FIGS. 9A and 9B are second views illustrating an example of the operation of the monitoring system. FIG. 9A illustrates a state in which the subject 610 is approaching the monitoring device 110.

FIG. 9B illustrates captured images 631, 902, and 633 captured by the monitoring device 110 at respective positions (positions 621, 901, and 623) of the subject 610 illustrated in FIG. 9A. It is assumed that when the captured images 631, 902, and 633 are obtained, the adjustment of the light emission intensity by the adjustment unit 506 has been completed, and the captured images 631, 902, and 633 have a level of image quality where the face area of the subject 610 may be detected.

In the case of the captured image 631, the face detection unit 502 determines that the block number of the block including the face area of the subject 610 is "2." Further, the face size calculation unit 801 determines that the size of the face area of the subject 610 is "SS."

Accordingly, the light emission intensity control unit 802 determines the light emission intensity to be "I5." Then, the light emission intensity output unit 507 controls the set 112_2 of LED 201_2 and diffractive optical element 202_2 to emit light with the light emission intensity "I5."

Similarly, in the case of the captured image 902, the face detection unit 502 determines that the block number of the block including the face area of the subject 610 is "2." Further, the face size calculation unit 801 determines that the size of the face area of the subject 610 is "S."

Accordingly, the light emission intensity control unit 802 determines the light emission intensity to be "I4". Then, the light emission intensity output unit 507 controls the set 112_2 of LED 201_2 and diffractive optical element 202_2 to emit light with the light emission intensity "I4."

Similarly, in the case of the captured image 633, the face detection unit 502 determines that the block number of the block including the face area of the subject 610 is "8, 11." The face size calculation unit 801 determines that the size of the face area of the subject 610 is "L."

Accordingly, the light emission intensity control unit 802 determines the light emission intensity to be "I2." Then, the light emission intensity output unit 507 controls the set 112_6 of LED 201_6 and diffractive optical element 202_6 and the set 112_8 of LED 201_8 and diffractive optical element 202_8 to emit light with the light emission intensity "I2."

Flow of Control Process

Figure 10:
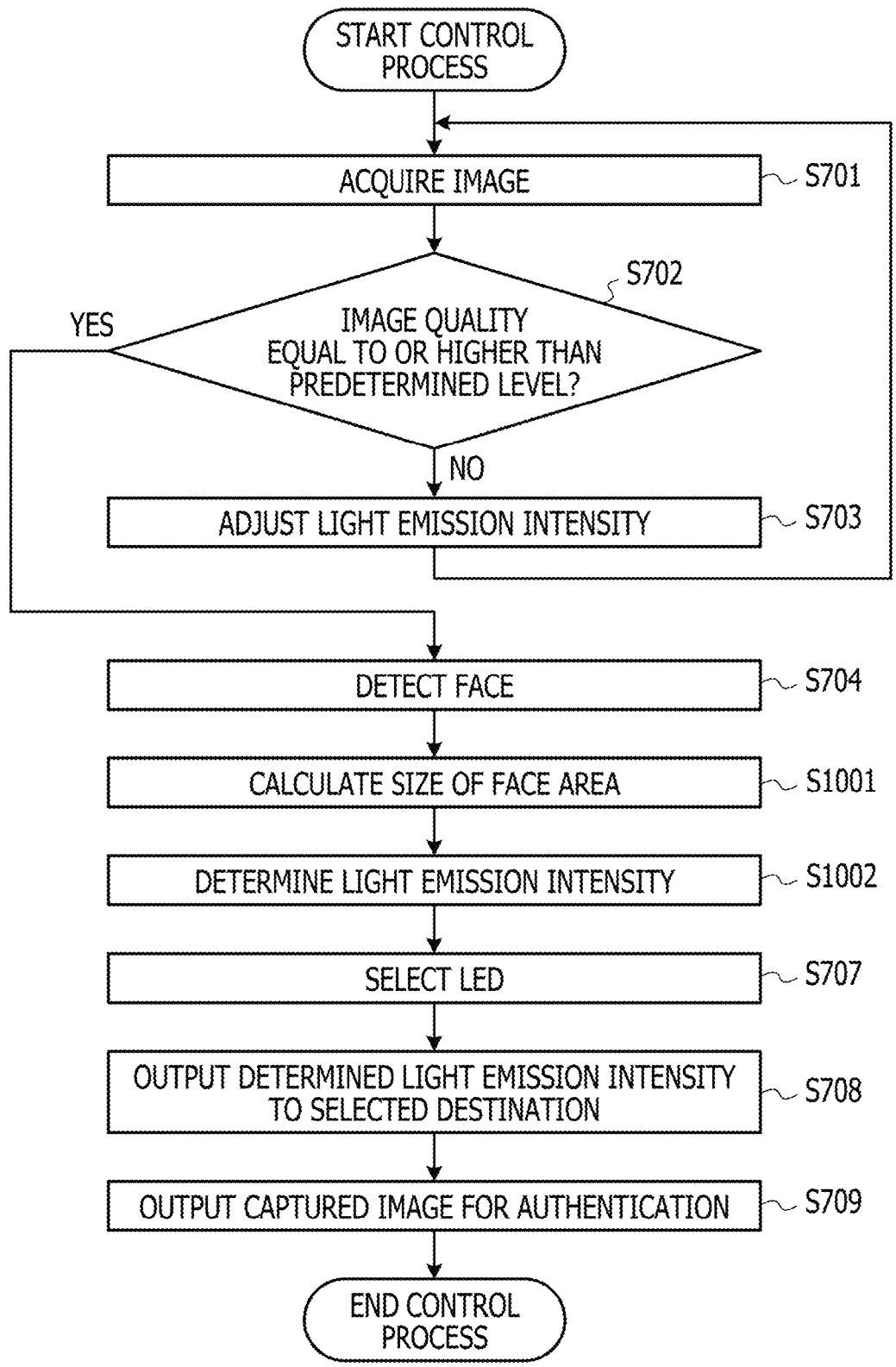
FIG. 10 is a second flowchart illustrating a flow of control process by the control device.

Next, a flow of the control process by the control device 120 according to the second embodiment will be described. FIG. 10 is a second flowchart illustrating a flow of the control process by the control device. The difference from the first flow chart illustrated in FIG. 7 lies in operations S1001 and S1002.

In operation S1001, the face size calculation unit 801 calculates the size of the face area of the subject notified from the face detection unit 502.

In operation S1002, the light emission intensity control unit 802 determines the light emission intensity based on the size of the face area calculated by the face size calculation unit 801.

As is apparent from the above description, the monitoring system according to the second embodiment detects the face area of the subject from the captured image of the image capturing unit, which is divided into a plurality of blocks according to the number of LEDs that irradiate the image capturing range of the image capturing unit. Further, the monitoring system according to the second embodiment controls an LED corresponding to a block including the face area of the subject among the plurality of blocks to emit light with the light emission intensity predetermined according to the size of the face area of the subject.

In this way, with the monitoring system according to the second embodiment, by controlling the light emission intensity using the relationship between the size of the face area of the subject and the image capturing distance to the subject, it is possible to capture the subject's face with constant brightness, regardless of the image capturing distance to the subject.

Third Embodiment

The case where the light emission intensity is determined based on the block to which the position of the face area of the subject belongs has been described in the first embodiment. However, the method for determining the light emission intensity is not limited thereto, but the light emission intensity may be determined according to the image quality of the block including the face area of the subject. Hereinafter, a third embodiment will be described focusing on the differences from the first embodiment.

Functional Configuration of Control Device

Figure 11:
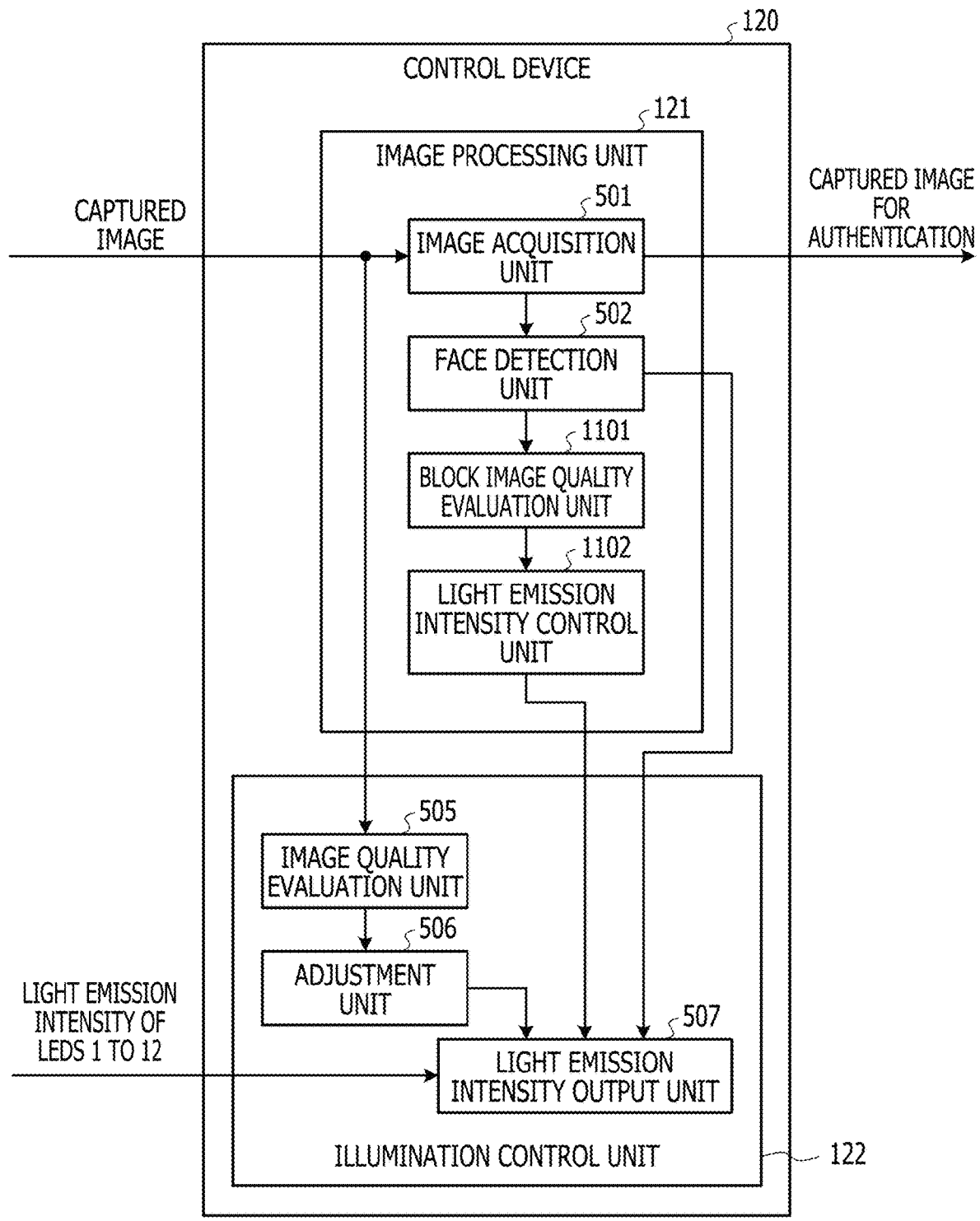
FIG. 11 is a third view illustrating an example of the functional configuration of the control device.

First, the functional configuration of the control device 120 according to the third embodiment will be described. FIG. 11 is a third view illustrating an example of the functional configuration of the control device. The difference from FIG. 5 is a block image quality evaluation unit 1101 and a light emission intensity control unit 1102.

The block image quality evaluation unit 1101 is an example of an evaluation unit, and evaluates the image quality of a block including the face area of the subject notified from the face detection unit 502. Specifically, the block image quality evaluation unit 1101 evaluates whether or not the block including the face area of the subject has a level of image quality where the authentication device 130 may execute a face authentication process. Further, the block image quality evaluation unit 1101 notifies the light emission intensity control unit 1102 of the evaluation result.

The light emission intensity control unit 1102 is an example of a control unit, and determines the light emission intensity based on the evaluation result notified from the block image quality evaluation unit 1101. Specifically, the light emission intensity control unit 1102 determines the light emission intensity of a set of LED and diffractive optical element that irradiates the corresponding image capturing range with spot lighting, so that the authentication device 130 may obtain an image quality necessary to execute the face authentication process.

Flow of Control Process

Figure 12:
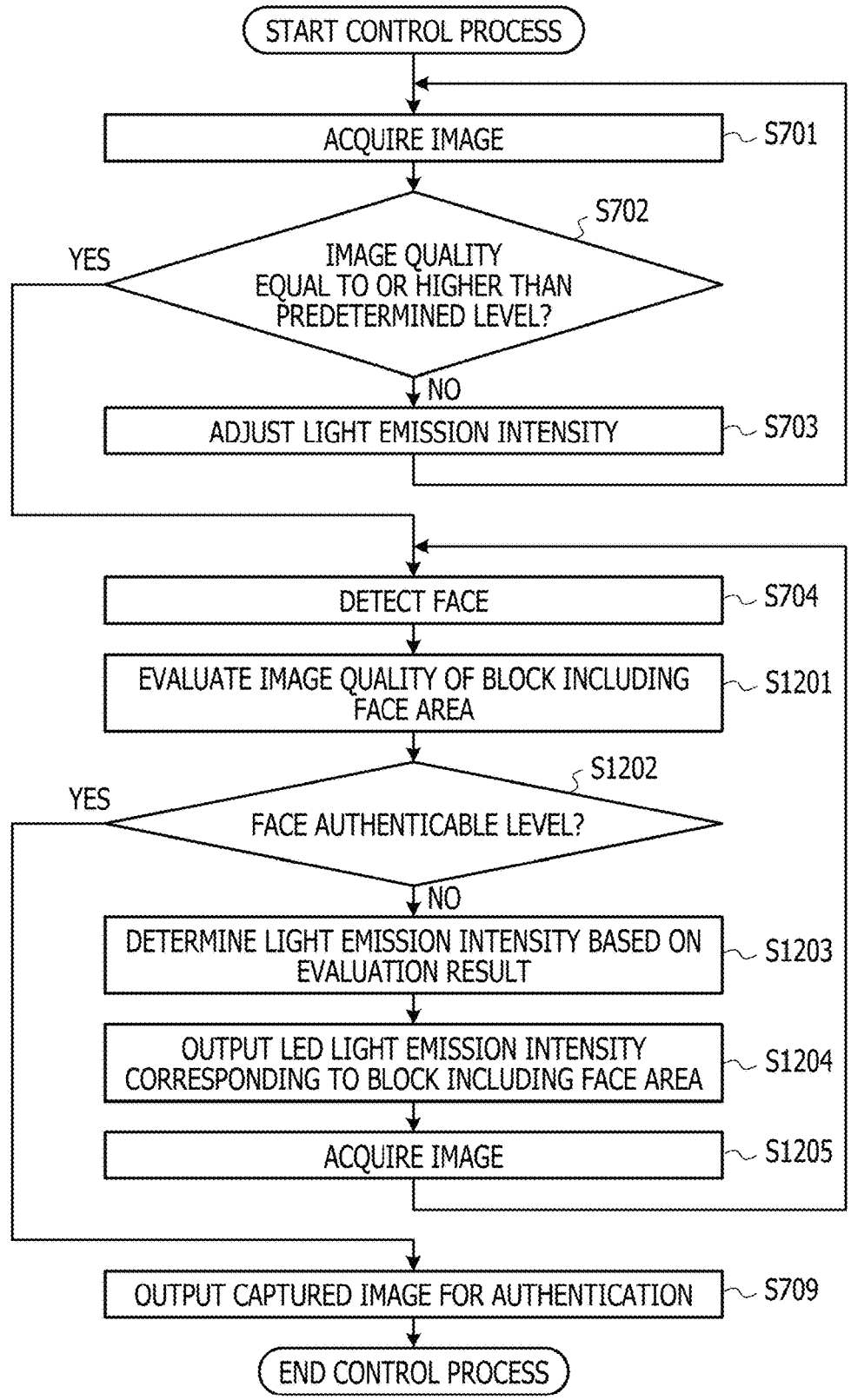
FIG. 12 is a third flow chart illustrating a flow of control process by the control device.

Next, a flow of the control process by the control device 120 according to the third embodiment will be described. FIG. 12 is a third flowchart illustrating a flow of the control process by the control device. The difference from the first flow chart illustrated in FIG. 7 lies in operations S1201 to S1205.

In operation S1201, the block image quality evaluation unit 1101 evaluates the image quality of a block including the face area of the subject notified from the face detection unit 502.

In operation S1202, the block image quality evaluation unit 1101 determines whether or not each block including the face area has a level of image quality where the face authentication process may be executed (whether the image quality is in a level where a face authentication is possible). When it is determined in operation S1202 that the block does not have a level of image quality where the face authentication is possible (No in operation S1202), the process proceeds to operation S1203.

In operation S1203, the light emission intensity control unit 1102 determines the light emission intensity based on the evaluation result.

In operation S1204, the light emission intensity output unit 507 transmits the determined light emission intensity to the LED mounting substrate so that a set of LED and diffractive optical element that irradiates the image capturing range corresponding to each block including the face area may emit light with the determined light emission intensity.

In operation S1205, the image acquisition unit 501 acquires the captured image from the monitoring device 110, and the process returns to operation S704

Meanwhile, when it is determined in operation S1202 that the image quality is in a level where the face authentication is possible (Yes in operation S1202), the process proceeds to operation S709.

In operation S709, the image acquisition unit 501 acquires the captured image from the image capturing unit 111 of the monitoring device 110 and transmits the acquired captured image to the authentication device 130 as a captured image for authentication.

As is apparent from the above description, the monitoring system according to the third embodiment detects the face area of the subject from the captured image of the image capturing unit, which is divided into a plurality of blocks according to the number of LEDs that irradiate the image capturing range of the image capturing unit. Further, the monitoring system according to the third embodiment controls an LED corresponding to a block including the face area of the subject among the plurality of blocks to emit light with the light emission intensity according to the evaluation result of the image quality of the block including the face area of the subject.

In this way, with the monitoring system according to the third embodiment, by controlling the light emission intensity using the evaluation result of the image quality of the block in which the face area of the subject is captured, it is possible to capture the subject's face with constant brightness, regardless of the image capturing distance to the subject and the surroundings.

Fourth Embodiment

The case where there is one subject appearing in the captured image transmitted from the image capturing unit 111 has been described in the first embodiment. However, the number of subjects appearing in the captured image transmitted from the image capturing unit 111 is not limited to one. In a fourth embodiment, a case will be described in which a plurality of subjects appear in the captured image transmitted from the image capturing unit 111. The description will be focused on the differences from the first embodiment.

Functional Configuration of Control Device

First, the functional configuration of the control device 120 according to the fourth embodiment will be described. FIG. 13 is a fourth view illustrating an example of the functional configuration of the control device. The difference from FIG. 5 lies in a face area number detection unit 1301.

The face area number detection unit 1301 counts the number of subject's face areas notified from the face detection unit 502, and notifies the face position detection unit 503 of the counted number of subject's face areas together with the face areas. Thereby, the face position detection unit 503 detects face area positions for the subject's face areas that correspond to the notified number of subject's face areas, and determines a block to which each detected face area position belongs. Further, the light emission intensity control unit 504 refers to the table 510 to determine the light emission intensity of a set of LED and diffractive optical element that irradiates the image capturing range corresponding to each block with spot lighting.

Example of Operation of Monitoring System

Figure 14A:
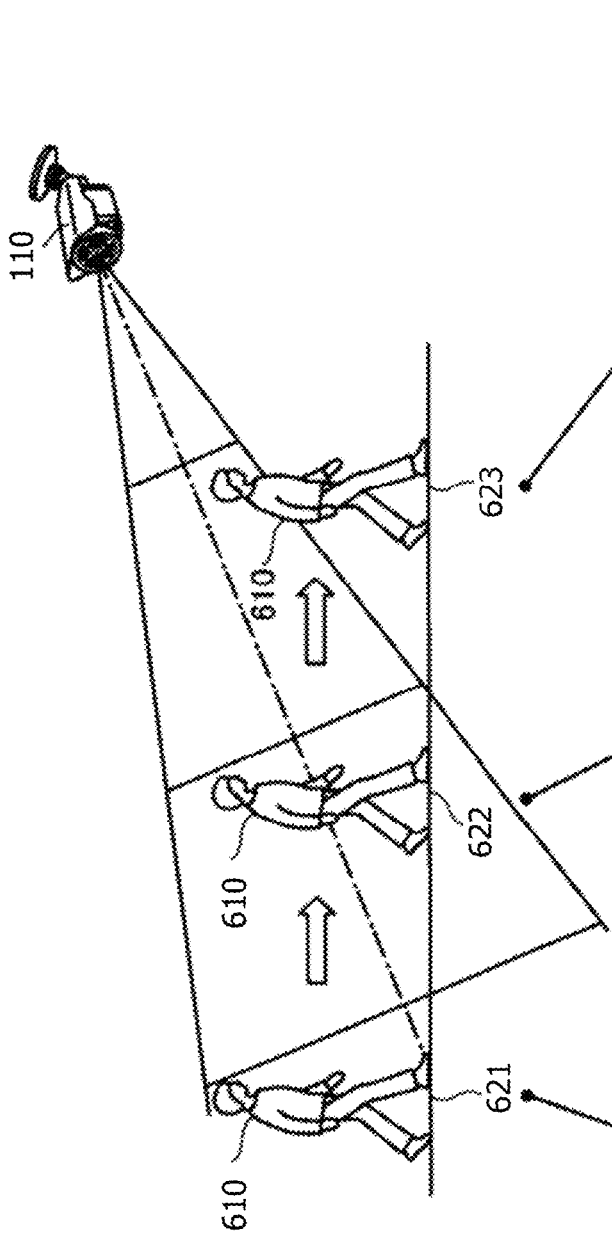
FIGS. 14A and 14B are third views illustrating an operation example of the monitoring system.
Figure 14B:
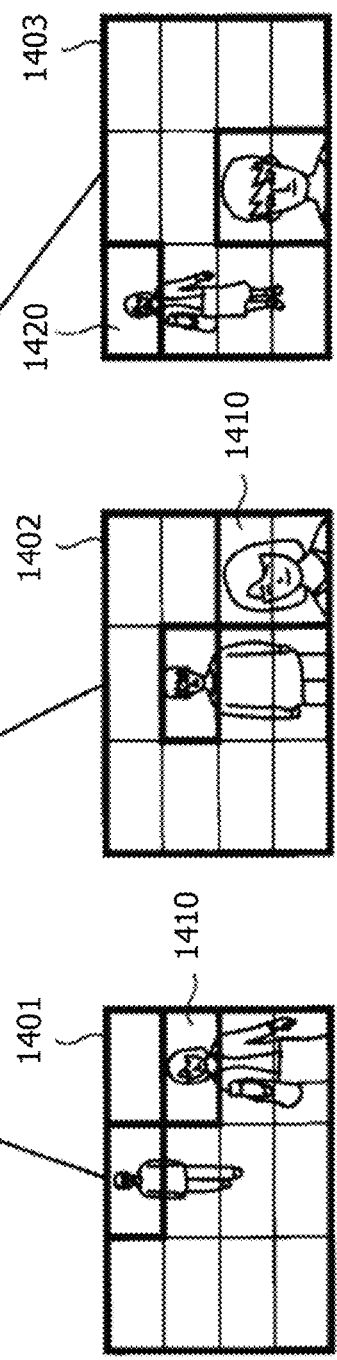

Next, an example of the operation of the monitoring system 100 including the control device 120 according to the fourth embodiment will be described. FIGS. 14A and 14B are third views illustrating an example of the operation of the monitoring system. FIG. 14A illustrates a state in which the subject 610 is approaching the monitoring device 110.

While FIG. 14A does not illustrate subjects other than the subject 610 due to space limitations, it is assumed that, at the point of time when the subject 610 is walking at the position 621, another subject 1410 is walking at a position closer to the monitoring device 110 than the subject 610. Further, it is assumed that, at the point of time when the subject 610 is walking at the position 622, another subject 1410 is walking at a position closer to the monitoring device 110 than the subject 610. Furthermore, it is assumed that, at the point of time when the subject 610 is walking at the position 623, another subject 1420 is walking at a position farther from the monitoring device 110 than the subject 610.

FIG. 14B illustrates captured images 1401, 1402, and 1403 obtained by the monitoring device 110 at respective positions (positions 621, 622, and 623) of the subject 610 illustrated in FIG. 14A. It is assumed that when the captured images 1401, 1402, and 1403 are obtained, the adjustment of the light emission intensity by the adjustment unit 506 has been completed, and the captured images 1401, 1402, and 1403 have a level of image quality where the face areas of the subjects 610, 1410, and 1420 may be detected.

In the case of the captured image 1401, the face detection unit 502 determines that the block numbers of the blocks including the face areas of the subjects 610 and 1410 are "2" and "6." Further, the face area number detection unit 1301 determines that the number of face areas is "2." Further, the face position detection unit 503 determines that the block number of the block to which the detected face area position of the subject 610 belongs is "2," and the block number of the block to which the detected face area position of the subject 1410 belongs is "6."

Accordingly, the light emission intensity control unit 504 determines the light emission intensity to be "I4" or "I3." Then, the light emission intensity output unit 507 controls the set 112_2 of LED 201_2 and diffractive optical element 202_2 to emit light with the light emission intensity "I4," and controls the set 112_4 of LED 201_4 and diffractive optical element 202_4 to emit light with the light emission intensity "I3."

Similarly, in the case of the captured image 1402, the face detection unit 502 determines that the block numbers of the blocks including the face areas of the subjects 610 and 1410 are "5" and "9, 12." Further, the face area number detection unit 1301 determines that the number of face areas is "2." Further, the face position detection unit 503 determines that the block number of the block to which the detected face area position of the subject 610 belongs is "5," and the block number of the block to which the detected face area position of the subject 1410 belongs is "9."

Accordingly, the light emission intensity control unit 504 determines the light emission intensity to be "I3" or "I2." Then, the light emission intensity output unit 507 controls the set 112_12 of LED 201_12 and diffractive optical element 202_12 to emit light with the light emission intensity "I3." Further, the light emission intensity output unit 507 controls the set 112_5 of LED 201_5 and diffractive optical element 202_5 and the set 112_7 of LED 201_7 and diffractive optical element 202_7 to emit light with the light emission intensity "I2."

Similarly, in the case of the captured image 1403, the face detection unit 502 determines that the block numbers of the blocks including the face areas of the subjects 610 and 1420 are "8, 11" and "1." Further, the face area number detection unit 1301 determines that the number of face areas is "2." Further, the face position detection unit 503 determines that the block number of the block to which the detected face area position of the subject 610 belongs is "11," and the block number of the block to which the detected face area position of the subject 1420 belongs is "1."

Accordingly, the light emission intensity control unit 504 determines the light emission intensity to be "I1" or "I4." Then, the light emission intensity output unit 507 controls the set 112_6 of LED 201_6 and diffractive optical element 202_6 and the set 112_8 of LED 201_8 and diffractive optical element 202_8 to emit light with the light emission intensity "IL." Further, the light emission intensity output unit 507 controls the set 112_1 of LED 201_1 and diffractive optical element 202_1 to emit light with the light emission intensity "I4."

Flow of Control Process

Figure 15:
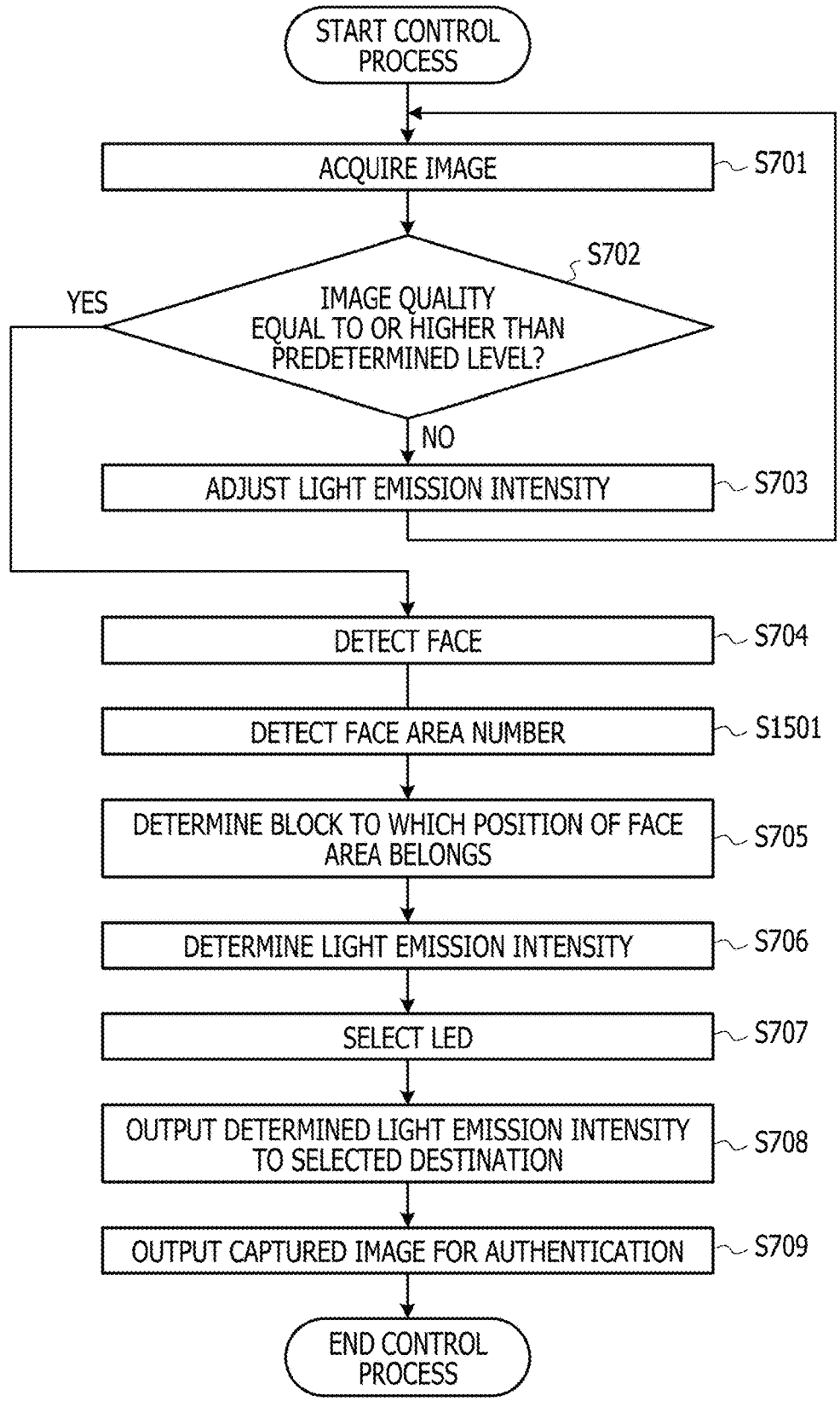
FIG. 15 is a fourth flowchart illustrating a flow of control process by the control device.

Next, a flow of the control process by the control device 120 according to the fourth embodiment will be described. FIG. 15 is a fourth flow chart illustrating a flow of the control process by the control device. The difference from the flowchart illustrated in FIG. 7 lies in operation S1501.

In operation S1501, the face area number detection unit 1301 counts the number of subject's face areas detected in operation S704. Thereby, in operation S705, the face position detection unit 503 detects face area positions for the notified number of subject's face areas, and determines a block to which each detected face area position belongs. In operation S706, the light emission intensity control unit 504 determines the light emission intensity corresponding to each block. Further, in operation S707, the face detection unit 502 determines a block including each of the detected face areas, and the light emission intensity control unit 504 selects a set of LED and diffractive optical element, which controls to emit light with the determined emission intensity.

As is apparent from the above description, the monitoring system according to the fourth embodiment performs the same process as in the first embodiment on the face area of each of a plurality of face areas of the subjects appearing in the captured image transmitted from the image capturing unit 111.

As a result, the monitoring system according to the fourth embodiment may obtain the same effects as the first embodiment.

OTHER EMBODIMENTS

In the above-described first and second embodiments, the light emission intensity control units 504 and 802 have been described as having the tables 510 and 810, respectively. However, each of the light emission intensity control units 504 and 802 may have a plurality of tables 510 and 810 in order to cope with a change in the surrounding environment such as the weather, the time zone and the like. Alternatively, instead of the tables 510 and 810, the light emission intensity control units 504 and 802 may perform a machine learning in advance on the correspondence relationship between the block to which the face area position belongs along with the surrounding environment, and the light emission intensity of the set of LED and diffractive optical element, and may use the learning result at that time.

In addition, in the control device 120, for example, the image quality evaluation unit 505 evaluates the quality of the captured image to specify the surrounding environment. Further, the light emission intensity control unit 504 determines the light emission intensity by referring to the table corresponding to the surrounding environment specified by the image quality evaluation unit 505, among the plurality of tables. Alternatively, the light emission intensity control unit 504 may determine the light emission intensity by inputting the block to which the subject' face area position belongs and the specified surrounding environment into the learning result.

In addition, in the third embodiment, the correspondence relationship between the image quality of the block including the face area and the light emission intensity of a set of LED and diffractive optical element is not mentioned, but the correspondence relationship may be, for example, defined by a table. Alternatively, the correspondence relationship may be defined based on machine learning.

In addition, in each of the above-described embodiments, the monitoring device 110 in which the image capturing unit 111 and the sets 112_1 to 112_12 of LEDs and diffractive optical elements are integrated has been described. However, the image capturing unit 111 and the set 112_1 to 112_12 of LEDs and diffractive optical elements may be separate devices.

In addition, in each of the above-described embodiments, the monitoring device 110 and the control device 120 are separate devices. However, the monitoring device 110 and the control device 120 may be an integrated device. Alternatively, some of the functions of the control device 120 may be implemented in the monitoring device 110.

The present disclosure is not limited to the elements described herein, and for example, the elements described in the foregoing embodiments may be combined with other elements. In view of this point, the present disclosure may be changed without departing from the gist of the present disclosure, and may be appropriately determined according to the application form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring system receiving, from an image capturing sensor, a captured image of an image capturing range illuminated by light emitting elements, comprising:
a memory; and
a processor coupled to the memory and configured to:
detect a face area of a subject from the captured image in the image capturing range divided into a rectangular array formed by rows and columns of a plurality of blocks according to the light emitting elements, formed in four linear arrays of at least three light emitting elements each, disposed alongside and substantially parallel to each of four sides of the image sensor, the light emitting elements having corresponding sets of diffractive optical elements that each convert light emitted from the light emitting elements into rectangular spot light that irradiate the image capturing range with each block irradiated by the rectangular spot light formed by one of the diffractive optical elements; and
control a light emission intensity of a light emitting element corresponding to a block including the face area among the plurality of blocks according to one of a position of the face area and a size of the face area.

2. The monitoring system according to claim 1,
wherein the blocks correspond to rectangles of spot light formed by diffractive optical elements through which light from the light emitting elements pass, respectively,
wherein the processor is further configured to determine the block to which the position of the face area belongs, and
wherein the processor is configured to control the light emission intensity passing through the diffractive optical elements by referring to a table in which the light emission intensity is associated in advance for each block to which the position of the face area belongs.

3. The monitoring system according to claim 1,
wherein the blocks correspond to rectangles of spot light formed by diffractive optical elements through which light from the light emitting elements pass, respectively,
wherein the processor is further configured to calculate the size of the face area, and
wherein the processor is configured to control the light emission intensity passing through the diffractive optical elements by referring to a table in which the light emission intensity is associated in advance for each size of the face area.

4. The monitoring system according to claim 1,
wherein the blocks correspond to rectangles of spot light formed by diffractive optical elements through which light from the light emitting elements pass, respectively,
wherein the processor is further configured to count a number of face areas, and
wherein the processor is configured to control the light emission intensity of the light passing through each of the diffractive optical elements corresponding to each of the blocks included in the face areas according to at least one of the position and the size of each of the face areas of the counted number.

5. The monitoring system according to claim 1, wherein an image quality of the captured image is evaluated every predetermined interval, and the light emission intensity is adjusted based on the evaluation result so that the face area of the subject is detected.

6. The monitoring system according to claim 1, wherein the four linear arrays of the at least three light emitting elements and the corresponding sets of the diffractive optical elements are integrated with the image capturing sensor that generates the captured image.

7. A monitoring system receiving, from an image capturing sensor, a captured image of an image capturing range illuminated by light emitting elements, comprising:
a memory; and
a processor coupled to the memory and configured to:
detect a face area of a subject from a captured image in the image capturing range divided into a rectangular array formed by rows and columns of a plurality of blocks according to the light emitting elements, formed in four linear arrays of at least three light emitting elements each, disposed alongside and substantially parallel to each of four sides of the image sensor, the light emitting elements having corresponding sets of diffractive optical elements that each convert light emitted from the light emitting elements into rectangular spot light that irradiate the image capturing range with each block irradiated by the rectangular spot light formed by one of the diffractive optical elements; and control a light emission intensity of a light emitting element corresponding to a block including the face area among the plurality of blocks according to an image quality of the block.

8. A monitoring method comprising:

detecting a face area of a subject from a captured image of an image capturing range divided into a rectangular array formed by rows and columns of a plurality of blocks according to light emitting elements, formed in four linear arrays of at least three light emitting elements each, disposed alongside and substantially parallel to each of fours sides of an image sensor, the light emitting elements having corresponding sets of diffractive optical elements that each convert light emitted from the light emitting elements into rectangular spot light that irradiate the image capturing range with each block irradiated by the rectangular spot light formed by one of the diffractive optical elements; and controlling a light emission intensity of a light emitting element corresponding to a block including the face area among the plurality of blocks according to one of a position of the face area and a size of the face area, by a processor.

* * * * *